(12) United States Patent
Scarlata et al.

(10) Patent No.: US 11,386,017 B2
(45) Date of Patent: Jul. 12, 2022

(54) TECHNOLOGIES FOR SECURE AUTHENTICATION AND PROGRAMMING OF ACCELERATOR DEVICES

(71) Applicant: Intel Corporation, Santa Clara, CA (US)

(72) Inventors: Vincent Scarlata, Beaverton, OR (US); Reshma Lal, Hillsboro, OR (US); Alpa Narendra Trivedi, Hillsboro, OR (US); Eric Innis, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 443 days.

(21) Appl. No.: 16/232,143

(22) Filed: Dec. 26, 2018

(65) Prior Publication Data

US 2019/0132136 A1 May 2, 2019

Related U.S. Application Data

(60) Provisional application No. 62/687,403, filed on Jun. 20, 2018.

(51) Int. Cl.
*H04L 9/32* (2006.01)
*H04L 9/08* (2006.01)
(Continued)

(52) U.S. Cl.
CPC ........ *G06F 12/1408* (2013.01); *G06F 9/3877* (2013.01); *G06F 9/45558* (2013.01);
(Continued)

(58) Field of Classification Search
CPC .............. G06F 12/1408; G06F 9/3877; G06F 9/45558; G06F 12/0802; G06F 21/57;
(Continued)

(56) References Cited

U.S. PATENT DOCUMENTS 10,057,243 B1\* 8/2018 Kumar .................... H04L 9/321
10,419,931 B1\* 9/2019 Sohail ........................ G06F 8/65
(Continued)

*Primary Examiner* — Kambiz Zand
*Assistant Examiner* — Phuc Pham
(74) *Attorney, Agent, or Firm* — Jaffery Watson Mendonsa & Hamilton LLP

(57) ABSTRACT

Technologies for secure authentication and programming of an accelerator device include a computing device having a processor and an accelerator. The processor establishes a trusted execution environment, which receives a unique device identifier from the accelerator, validates a device certificate for the device identifier, authenticates the accelerator in response to validating the accelerator, validates attestation information of the accelerator, and establishes a secure channel with the accelerator. The trusted execution environment may securely program a data key and a bitstream key to the accelerator, and may encrypt a bitstream image and securely program the bitstream image to the accelerator. The accelerator and a tenant may securely exchange data protected by the data key. The trusted execution environment may be a secure enclave, and the accelerator may be a field programmable gate array (FPGA). Other embodiments are described and claimed.

25 Claims, 7 Drawing Sheets

(51) Int. Cl.

| | | |
|---|---|---|
| *G06F 21/60* | (2013.01) | |
| *G06F 21/76* | (2013.01) | |
| *G06F 12/14* | (2006.01) | |
| *G06F 9/455* | (2018.01) | |
| *G06F 21/57* | (2013.01) | |
| *G06F 21/64* | (2013.01) | |
| *H04L 41/28* | (2022.01) | |
| *G06F 21/79* | (2013.01) | |
| *H04L 41/046* | (2022.01) | |
| *H04L 9/06* | (2006.01) | |
| *G06F 9/38* | (2018.01) | |
| *G06F 12/0802* | (2016.01) | |

(52) U.S. Cl.
CPC ......... *G06F 12/0802* (2013.01); *G06F 21/57* (2013.01); *G06F 21/602* (2013.01); *G06F 21/606* (2013.01); *G06F 21/64* (2013.01); *G06F 21/76* (2013.01); *G06F 21/79* (2013.01); *H04L 9/0631* (2013.01); *H04L 9/0637* (2013.01); *H04L 9/083* (2013.01); *H04L 9/085* (2013.01); *H04L 9/0838* (2013.01); *H04L 9/0844* (2013.01); *H04L 9/0891* (2013.01); *H04L 9/321* (2013.01); *H04L 9/3215* (2013.01); *H04L 9/3226* (2013.01); *H04L 9/3268* (2013.01); *H04L 9/3278* (2013.01); *H04L 41/046* (2013.01); *H04L 41/28* (2013.01); *G06F 2009/45591* (2013.01); *G06F 2009/45595* (2013.01)

(58) Field of Classification Search
CPC ...... G06F 21/602; G06F 21/606; G06F 21/64; G06F 21/76; G06F 21/79; H04L 9/0631; H04L 9/0637; H04L 9/083; H04L 9/0838; H04L 9/0844; H04L 9/085; H04L 9/0891; H04L 9/321; H04L 9/3215; H04L 9/3226; H04L 9/3268; H04L 9/3278; H04L 41/28
USPC .......................................................... 713/156
See application file for complete search history.

(56) References Cited

U.S. PATENT DOCUMENTS

| | | | |
|---|---|---|---|
| 2015/0347768 A1* | 12/2015 | Martin | G06F 21/62 726/1 |
| 2017/0006030 A1* | 1/2017 | Krishnamoorthy | H04L 63/0823 |
| 2017/0024570 A1* | 1/2017 | Pappachan | G06F 21/602 |
| 2019/0044724 A1* | 2/2019 | Sood | H04L 9/0861 |

\* cited by examiner

TECHNOLOGIES FOR SECURE AUTHENTICATION AND PROGRAMMING OF ACCELERATOR DEVICES

CROSS-REFERENCE TO RELATED APPLICATION

The present application claims the benefit of U.S. Provisional Patent Application No. 62/687,403, filed Jun. 20, 2018.

BACKGROUND

Current processors may provide support for a trusted execution environment such as a secure enclave. Secure enclaves include segments of memory (including code and/or data) protected by the processor from unauthorized access including unauthorized reads and writes. In particular, certain processors may include Intel® Software Guard Extensions (SGX) to provide secure enclave support. In particular, SGX provides confidentiality, integrity, and replay-protection to the secure enclave data while the data is resident in the platform memory and thus provides protection against both software and hardware attacks. The on-chip boundary forms a natural security boundary, where data and code may be stored in plaintext and assumed to be secure. Intel® SGX does not protect I/O data that moves across the on-chip boundary.

Modern computing devices may include general-purpose processor cores as well as a variety of hardware accelerators for offloading compute-intensive workloads or performing specialized tasks. Hardware accelerators may include, for example, one or more field-programmable gate arrays (FPGAs), which may include programmable digital logic resources that may be configured by the end user or system integrator. Hardware accelerators may also include one or more application-specific integrated circuits (ASICs). Hardware accelerators may be embodied as I/O devices that communicate with the processor core over an I/O interconnect.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
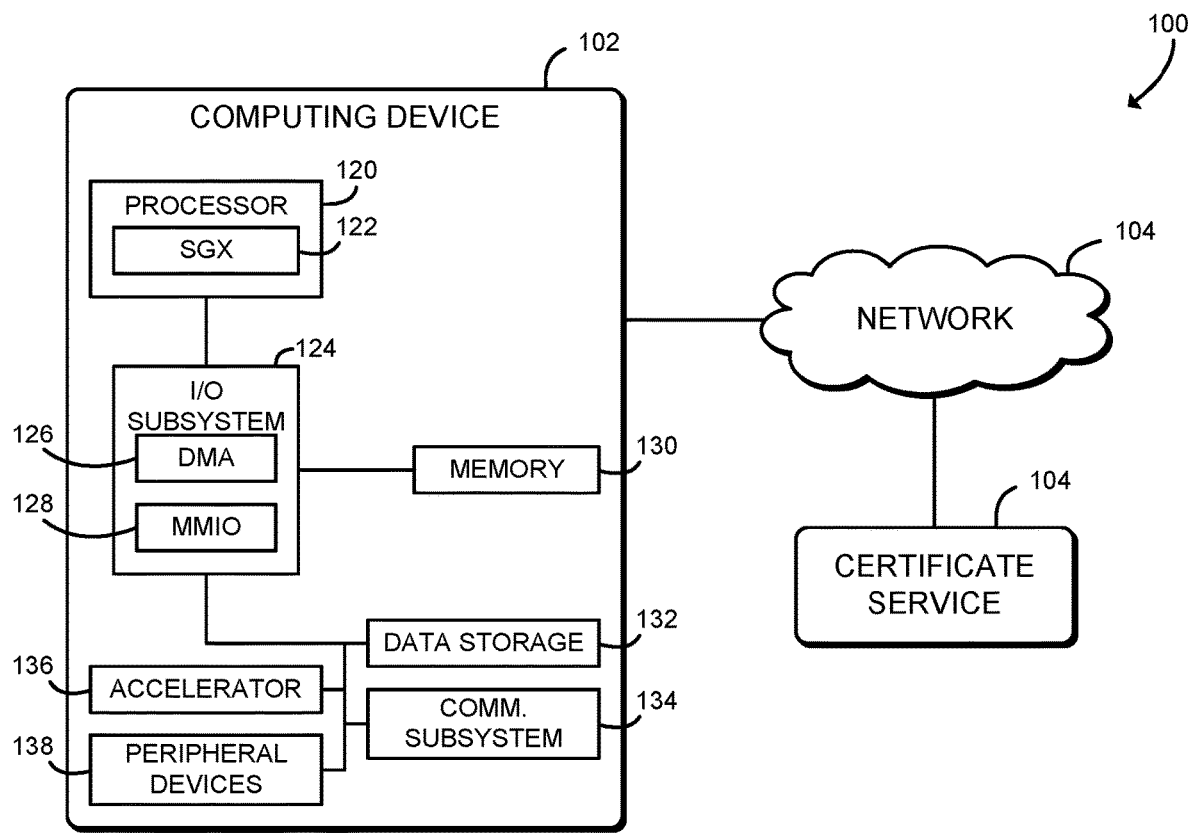
FIG. 1 is a simplified block diagram of at least one embodiment of a system for secure authentication and programming of an accelerator device.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for secure authentication and programming of accelerator devices includes a computing device 102 with a processor 120 and an accelerator device 136, such as a field-programmable gate array (FPGA). In use, as described further below, a trusted execution environment established by the processor 120 authenticates the accelerator device 136. The processor 120 may communicate with a certificate service 104 over a network 106 to authenticate the accelerator device 136. After successful authentication, the trusted execution environment may securely program the accelerator device 136 (e.g., configure the FPGA). After programming, an application in a trusted execution environment established by the processor 120 securely communicates data with the processor 120. Thus, the system 100 allows code and data to be securely communicated between an application executed by the processor 120 and an accelerator device 136. The system 100 may keep untrusted software of the computing device 102, such as the operating system or virtual machine monitor, outside of the trusted code base (TCB) of the accelerator code and data. Thus, the system 100 may secure accelerator code and data from an owner of the computing device 102 (e.g., a cloud service provider) or other tenants of the computing device 102. Accordingly, the system 100 may improve security and performance for multi-tenant environments by allowing secure use of accelerator devices.

The computing device 102 may be embodied as any type of device capable of performing the functions described herein. For example, the computing device 102 may be embodied as, without limitation, a computer, a laptop computer, a tablet computer, a notebook computer, a mobile computing device, a smartphone, a wearable computing device, a multiprocessor system, a server, a workstation, and/or a consumer electronic device. Additionally or alternatively, the computing device 102 may be embodied as a one or more compute sleds, memory sleds, accelerator sleds, or other racks, sleds, computing chassis, or other components of a physically disaggregated computing device. As shown in FIG. 1, the illustrative computing device 102 includes a processor 120, an I/O subsystem 124, a memory 130, and a data storage device 132. Additionally, in some embodiments, one or more of the illustrative components may be incorporated in, or otherwise form a portion of, another component. For example, the memory 130, or portions thereof, may be incorporated in the processor 120 in some embodiments.

The processor 120 may be embodied as any type of processor capable of performing the functions described herein. For example, the processor 120 may be embodied as a single or multi-core processor(s), digital signal processor, microcontroller, or other processor or processing/controlling circuit. As shown, the processor 120 illustratively includes secure enclave support 122, which allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 130. The secure enclave support 122 may be embodied as a set of processor instruction extensions that allows the processor 120 to establish one or more secure enclaves in the memory 130. For example, the secure enclave support 122 may be embodied as Intel® Software Guard Extensions (SGX) technology.

The memory 130 may be embodied as any type of volatile or non-volatile memory or data storage capable of performing the functions described herein. In operation, the memory 130 may store various data and software used during operation of the computing device 102 such as operating systems, applications, programs, libraries, and drivers. As shown, the memory 130 may be communicatively coupled to the processor 120 via the I/O subsystem 124, which may be embodied as circuitry and/or components to facilitate input/output operations with the processor 120, the memory 130, and other components of the computing device 102. For example, the I/O subsystem 124 may be embodied as, or otherwise include, memory controller hubs, input/output control hubs, sensor hubs, host controllers, firmware devices, communication links (i.e., point-to-point links, bus links, wires, cables, light guides, printed circuit board traces, etc.) and/or other components and subsystems to facilitate the input/output operations. In some embodiments, the memory 130 may be directly coupled to the processor 120, for example via an integrated memory controller hub. Additionally, in some embodiments, the I/O subsystem 124 may form a portion of a system-on-a-chip (SoC) and be incorporated, along with the processor 120, the memory 130, the accelerator device 136, and/or other components of the computing device 102, on a single integrated circuit chip. Additionally or alternatively, in some embodiments the processor 120 may include an integrated memory controller and a system agent, which may be embodied as a logic block in which data traffic from processor cores and I/O devices converges before being sent to the memory 130.

As shown, the I/O subsystem 124 includes a direct memory access (DMA) engine 126 and a memory-mapped I/O (MMIO) engine 128. The processor 120, including secure enclaves established with the secure enclave support 122, may communicate with the accelerator device 136 with one or more DMA transactions using the DMA engine 126 and/or with one or more MMIO transactions using the MMIO engine 128. The computing device 102 may include multiple DMA engines 126 and/or MMIO engines 128 for handling DMA and MMIO read/write transactions based on bandwidth between the processor 120 and the accelerator 136. Although illustrated as being included in the I/O subsystem 124, it should be understood that in some embodiments the DMA engine 126 and/or the MMIO engine 128 may be included in other components of the computing device 102 (e.g., the processor 120, memory controller, or system agent), or in some embodiments may be embodied as separate components.

The data storage device 132 may be embodied as any type of device or devices configured for short-term or long-term storage of data such as, for example, memory devices and circuits, memory cards, hard disk drives, solid-state drives, non-volatile flash memory, or other data storage devices. The computing device 102 may also include a communications subsystem 134, which may be embodied as any communication circuit, device, or collection thereof, capable of enabling communications between the computing device 102 and other remote devices over a computer network (not shown). The communications subsystem 134 may be configured to use any one or more communication technology (e.g., wired or wireless communications) and associated protocols (e.g., Ethernet, Bluetooth®, Wi-Fi®, WiMAX, 3G, 4G LTE, etc.) to effect such communication.

The accelerator device 136 may be embodied as a field-programmable gate array (FPGA), an application-specific integrated circuit (ASIC), a coprocessor, or other digital logic device capable of performing accelerated functions (e.g., accelerated application functions, accelerated network functions, or other accelerated functions). Illustratively, the accelerator device 136 is an FPGA, which may be embodied as an integrated circuit including programmable digital logic resources that may be configured after manufacture. The FPGA may include, for example, a configurable array of logic blocks in communication over a configurable data interchange. The accelerator device 136 may be coupled to the processor 120 via a high-speed connection interface such as a peripheral bus (e.g., a PCI Express bus) or an inter-processor interconnect (e.g., an in-die interconnect (IDI) or QuickPath Interconect (QPI)), or via any other appropriate interconnect. The accelerator device 136 may receive data and/or commands for processing from the processor 120 and return results data to the processor 120 via DMA, MMIO, or other data transfer transactions.

As shown, the computing device 102 may further include one or more peripheral devices 138. The peripheral devices 138 may include any number of additional input/output devices, interface devices, hardware accelerators, and/or other peripheral devices. For example, in some embodiments, the peripheral devices 138 may include a touch screen, graphics circuitry, a graphical processing unit (GPU) and/or processor graphics, an audio device, a microphone, a camera, a keyboard, a mouse, a network interface, and/or other input/output devices, interface devices, and/or peripheral devices.

The certificate service 104 may be embodied as any type of server computing device, or collection of devices, capable of performing the functions described herein. As such, the certificate service 104 may be embodied as a single server computing device or a collection of servers and associated devices. For example, in some embodiments, the certificate service 104 may be embodied as a "virtual server" formed from multiple computing devices distributed across the network 106 and operating in a public or private cloud. Accordingly, although the certificate service 104 is illustrated in FIG. 1 as embodied as a single server computing device, it should be appreciated that the certificate service 104 may be embodied as multiple devices cooperating together to facilitate the functionality described below. Illustratively, the certificate service 104 may include components and features similar to the computing device 102, such as a processor 120, I/O subsystem 124, memory 130, data storage 132, communication subsystem 134, and various peripheral devices 138. Those individual components of the certificate service 104 may be similar to the corresponding components of the computing device 102, the description of which is applicable to the corresponding components of the certificate service 104 and is not repeated for clarity of the present description.

As discussed in more detail below, the computing device 102 and the certificate server 104 may be configured to transmit and receive data with each other and/or other devices of the system 100 over the network 106. The network 106 may be embodied as any number of various wired and/or wireless networks. For example, the network 106 may be embodied as, or otherwise include a wired or wireless local area network (LAN), and/or a wired or wireless wide area network (WAN). As such, the network 106 may include any number of additional devices, such as additional computers, routers, and switches, to facilitate communications among the devices of the system 100.

Figure 2:
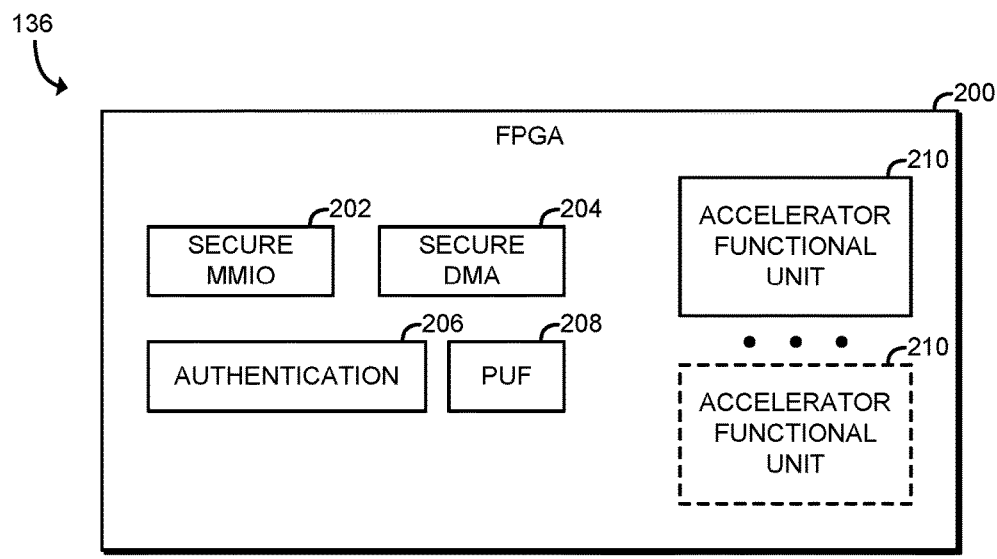
FIG. 2 is a simplified block diagram of at least one embodiment of an accelerator device of the computing device of FIG. 1.

Referring now to FIG. 2, an illustrative embodiment of a field-programmable gate array (FPGA) 200 is shown. As shown, the FPGA 200 is one potential embodiment of an accelerator device 136. The illustratively FPGA 200 includes a secure MMIO engine 202, a secure DMA engine 204, authentication logic 206, a physical unclonable function (PUF) 208, and one or more accelerator functional units (AFUs) 210. The secure MMIO engine 202 and the secure DMA engine 204 perform in-line authenticated cryptographic operations on data transferred between the processor 120 (e.g., a secure enclave established by the processor) and the FPGA 200 (e.g., one or more AFUs 210). In some embodiments, the secure MMIO engine 202 and/or the secure DMA engine 204 may intercept, filter, or otherwise process data traffic on one or more cache-coherent interconnects, internal buses, or other interconnects of the FPGA 200.

The PUF 208 may be embodied as any function that provides a unique, unforgeable device identifier for the FPGA 200. In some embodiments, the PUF 208 may be embodied as an electronic circuit or other electronic device that, in response to receiving a challenge signal, generates a response signal. For example, the PUF 208 may receive a voltage signal, a power signal, or other electronic signal and generate a response voltage signal, current signal, or other electrical response. Due to manufacturing variations, the response of each PUF 208 to the challenge signal is unique and cannot be copied in another PUF 208. Additionally, in some embodiments the PUF 208 may include or be otherwise coupled to one or more fuses, switches, or other one-time-use devices that, when activated, modify the response of the PUF 208 to the challenge signal.

The authentication logic 206 may be embodied as fixed function hardware, configurable hardware, firmware, or other logic resources of the FPGA 200. In some embodiments, the authentication logic 206 may be pre-configured or otherwise supplied by a manufacturer, OEM, owner, or other authority associated with the FPGA. As described further below, authentication logic 206 is configured to allow secure authentication and programming of the FPGA 200.

Each AFU 210 may be embodied as logic resources of the FPGA 200 that are configured to perform an acceleration task. Each AFU 210 may be associated with an application executed by the computing device 102 in a secure enclave or other trusted execution environment. Each AFU 210 may be configured or otherwise supplied by a tenant or other user of the computing device 102. For example, each AFU 210 may correspond to a bitstream image programmed to the FPGA 200. As described further below, data associated with each AFU 210, including the bitstream image and data exchanged with the trusted execution environment, may be cryptographically protected from untrusted components of the computing device 100 (e.g., protected from software outside of the trusted code base of the tenant enclave).

Figure 3:
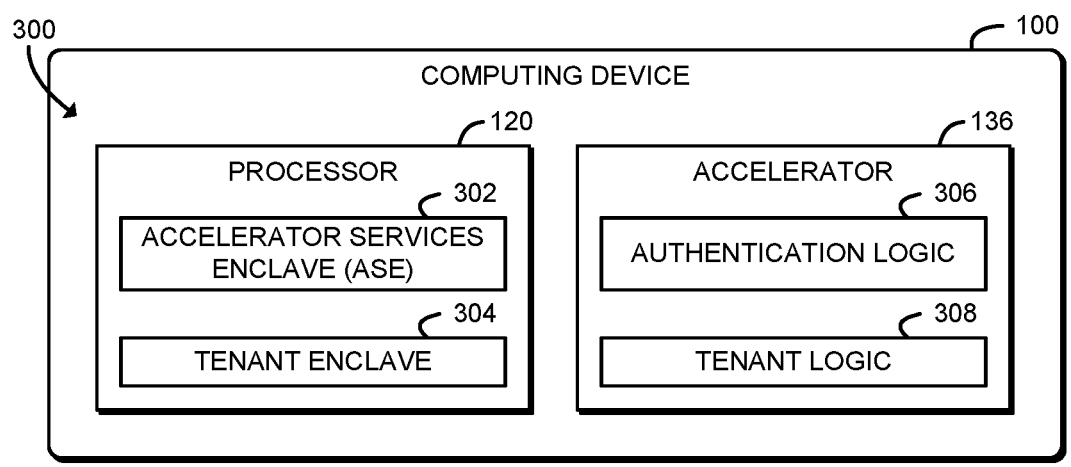
FIG. 3 is a simplified block diagram of at least one embodiment of an environment of the computing device of FIGS. 1-2.

Referring now to FIG. 3, in an illustrative embodiment, the computing device 102 establishes an environment 300 during operation. The illustrative environment 300 includes an accelerator services enclave (ASE) 302, a tenant enclave 304, authentication logic 306, and tenant logic 308. The various components of the environment 300 may be embodied as hardware, firmware, software, or a combination thereof. As such, in some embodiments, one or more of the components of the environment 300 may be embodied as circuitry or collection of electrical devices (e.g., ASE circuitry 302, tenant enclave circuitry 304, authentication logic circuitry 306, and/or tenant logic circuitry 308). It should be appreciated that, in such embodiments, one or more of the ASE circuitry 302, the tenant enclave circuitry 304, the authentication logic circuitry 306, and/or the tenant logic circuitry 308 may form a portion of the processor 120, the I/O subsystem 124, the accelerator device 136, and/or other components of the computing device 102. Additionally, in some embodiments, one or more of the illustrative components may form a portion of another component and/or one or more of the illustrative components may be independent of one another.

Each of the ASE 302 and the tenant enclave 304 may be embodied as a trusted execution environment of the computing device 102 that is authenticated and protected from unauthorized access using hardware support of the computing device 102, such as the secure enclave support 122 of the processor 120. Illustratively, each of the ASE 302 and the tenant enclave 304 is a secure enclave established using Intel SGX technology.

The authentication logic 306 may be embodied as hardware, firmware, pre-configured logic, or other logic resources of the accelerator device 136 (e.g., as authentication logic 206 of an FPGA 200). Similarly, the tenant logic 308 may be embodied as hardware, firmware, user-configured logic, or other logic resources of the accelerator device 136 (e.g., as an AFU 210 of an FPGA 200).

The ASE 302 is configured to receive a unique device identifier from the accelerator device 136 and to validate a device certificate for the unique device identifier. The device identifier may be based on a PUF 208 of the accelerator device 136. The ASE 302 may be further configured to request the device certificate for the unique device identifier from the certificate service 104. The ASE 302 is further configured to authenticate the accelerator device 136 in response to validation of the device certificate. Authenticating the accelerator device 136 includes receiving attestation information indicative of a device configuration of the accelerator device 136 and validating the attestation information based on the device certificate. The ASE 302 is further configured to establish a secure channel with the accelerator device 136 in response to validation of the attestation information. The ASE 302 may be further configured to establish a data key and to securely communicate a data key to the accelerator device 136 via the secure channel.

The ASE 302 may be further configured to authenticate the tenant enclave 304, which includes a tenant application or other user application. The ASE 302 may be configured to securely receive the data key from the tenant enclave 304. The ASE 302 may be further configured to establish a bitstream image key, to securely communicate the bitstream image key to the accelerator device 136 via the secure channel, and to program the accelerator device 136 with an encrypted bitstream image. The ASE 302 may be configured to receive the encrypted bitstream image from the tenant enclave 304 in response to authentication of the tenant enclave 304. A plaintext bitstream image is encrypted with the bitstream image key.

The ASE 302 may be further configured to decrypt the encrypted bitstream image with the bitstream image key to recover the plaintext bitstream image. The ASE 302 may be further configured to determine whether the plaintext bitstream image satisfies an owner policy and, if so, to program the accelerator device 136. The owner policy may be a hardware safety policy for an FPGA accelerator device 136.

The tenant enclave 304 is configured to authenticate with the ASE 302 and to securely provide the data key to the ASE 302. The tenant enclave 304 is configured to securely exchange data protected by the data key between the tenant application and the accelerator device 136. The tenant enclave 304 may be configured to a provide an encrypted bitstream image and the bitstream image key to the ASE 302 for programming to the accelerator device 136.

The authentication logic 306 is configured to provide a unique device identifier to the ASE 302. As described above, the device identifier may be based on a PUF 208 of the accelerator device 136. The authentication logic 306 is further configured to authenticate the accelerator device 136 with the ASE 302, which includes providing attestation information indicative of a device configuration of the accelerator device 136. The attestation information may include one or more testable attributes, such as a firmware version of the accelerator device 136. The tenant logic 308 is configured to securely exchange data protected by the data key between the tenant application and the accelerator device 136.

Figure 4:
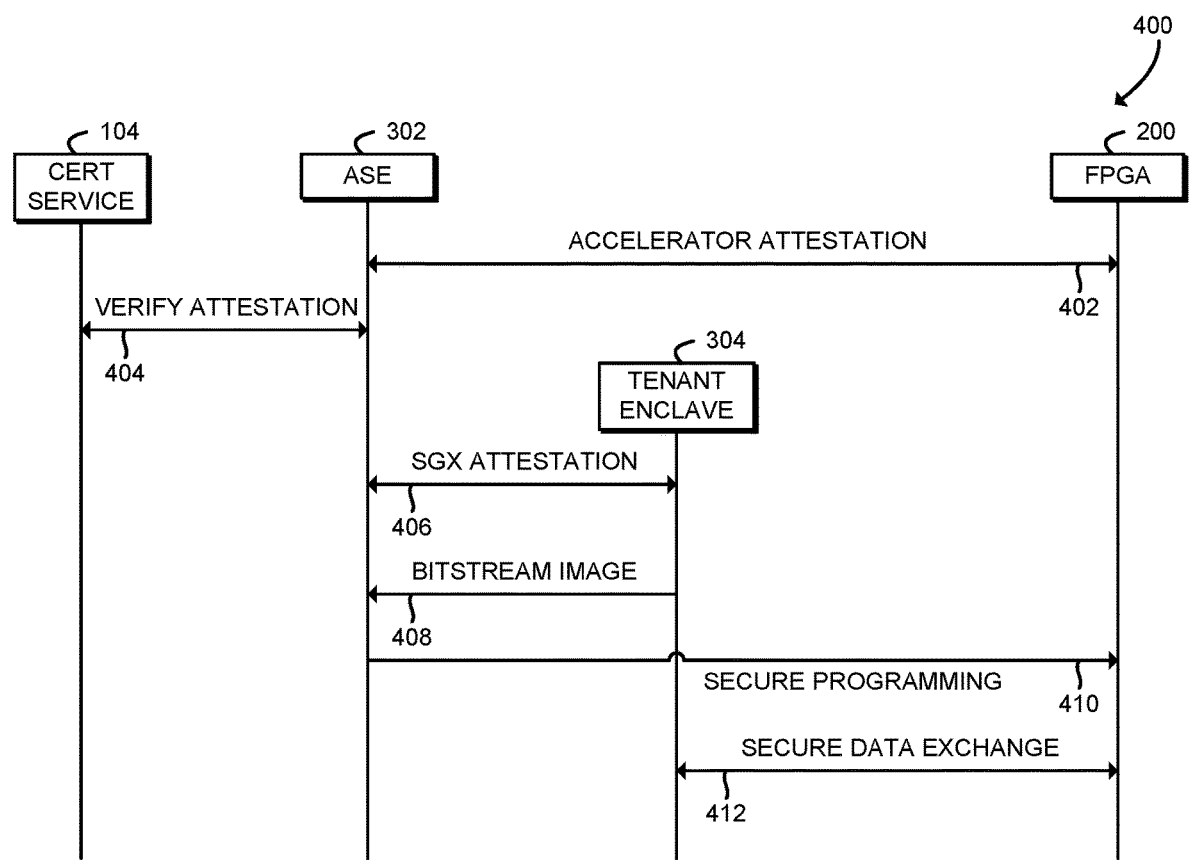
FIG. 4 is a simplified interaction diagram of a method for secure authentication and programming of an accelerator device that may be executed by the system of FIG. 1.

Referring now to FIG. 4, in use, the system 100 may execute a method 400 for secure authentication and programming of an accelerator device 136, illustratively an FPGA 200. In interaction 402, the ASE 302 and FPGA 200 perform accelerator attestation. After receiving attestation data from the FPGA 200, in interaction 404 the ASE 302 verifies the attestation data using certificate information from the certificate service 302. After verifying the attestation, in interaction 406 the ASE 302 and the tenant enclave 304 perform SGX attestation. After successful attestation, in interaction 408 the tenant enclave 304 supplies a bitstream image to the ASE 302. The tenant enclave 304 may also supply the ASE 302 with one or more keys used to encrypt the bitstream image. In interaction 410, the ASE 302 securely programs the FPGA 200 with the bitstream image and one or more of the associated encryption keys. In interaction 412, the tenant enclave 304 and the FPGA 200 securely exchange data, for example accelerated application data. Potential embodiments of a method for secure authentication and programming of the accelerator device 136 that may be executed by the ASE 302 are discussed below in connection with FIGS. 5-6. Potential embodiments of a method for secure authentication and programming of the accelerator device that may be executed by the FPGA 200 are discussed below in connection with FIG. 7. Potential embodiments of a method for secure authentication and programming of the accelerator device that may be executed by the tenant enclave 304 are discussed below in connection with FIG. 8.

Figure 5:
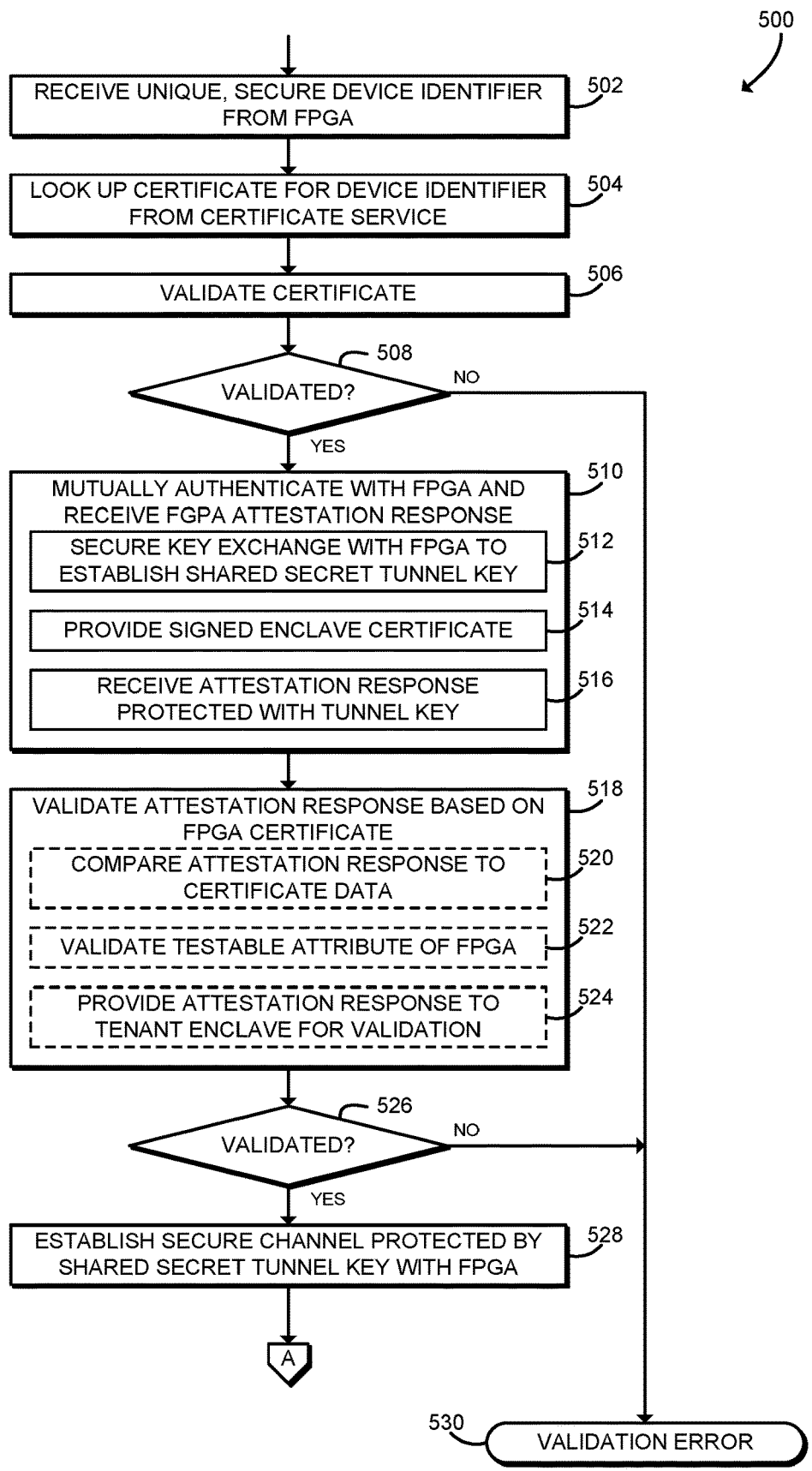
FIGS. 5 and 6 are a simplified flow diagram of at least one embodiment of a method for secure authentication and programming of an accelerator device that may be executed by a computing device of FIGS. 1-3.
Figure 6:
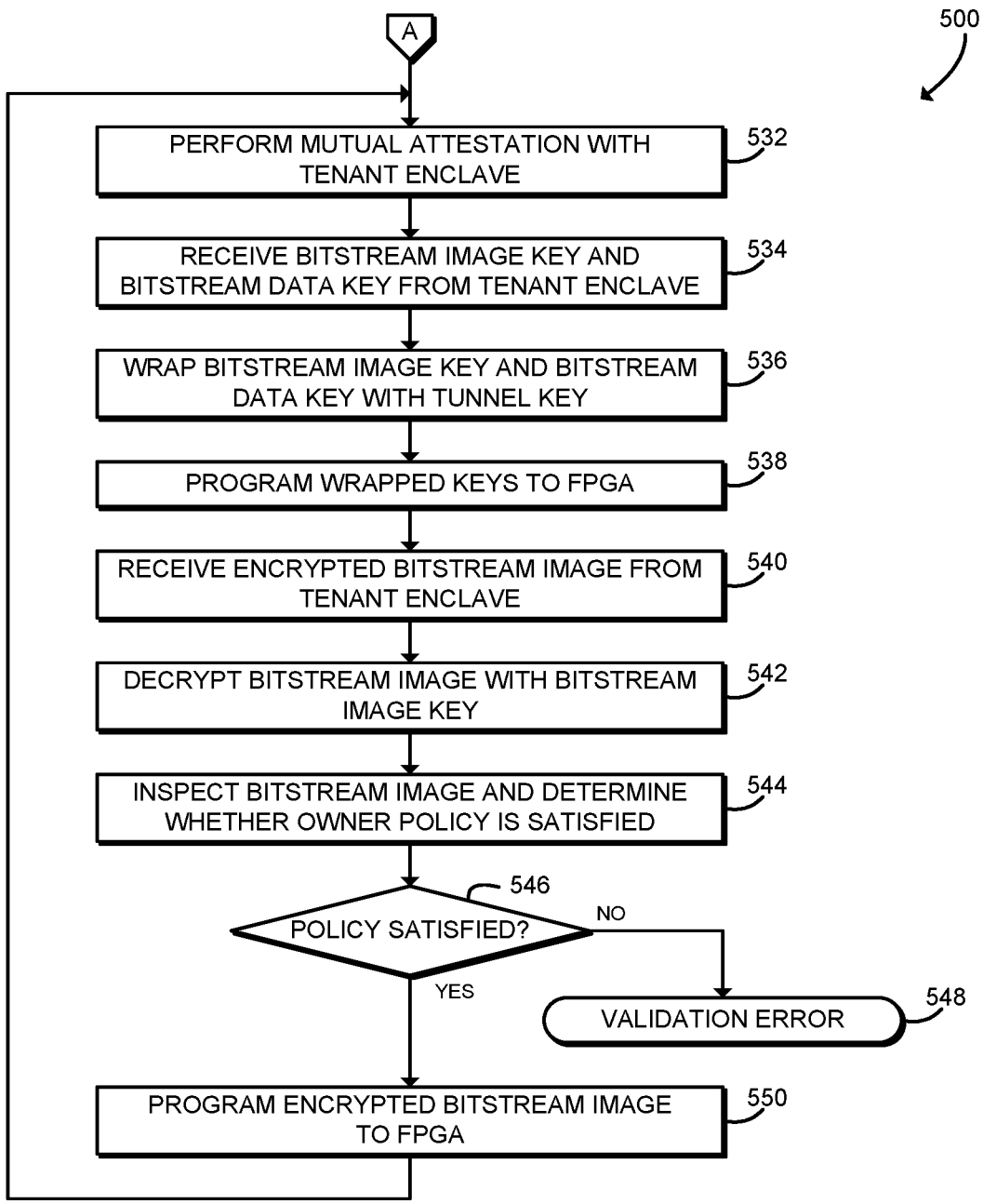

Referring now to FIGS. 5 and 6, in use, the computing device 102 may execute a method 500 for secure authentication and programming of an accelerator device 136. It should be appreciated that, in some embodiments, the operations of the method 500 may be performed by one or more components of the environment 300 of the computing device 102 as shown in FIG. 3 (e.g., the ASE 302). The method 500 begins in block 502, in which the ASE 302 receives a unique, secure device identifier from an accelerator device 136, which is illustratively an FPGA 200. As described above, the ASE 302 establishes a trusted execution environment for code executed by the processor 120. The device identifier may be received, for example, in response to a request from the ASE 302. The device identifier may be embodied as a value returned by a PUF 208 of the FPGA 200, a PUF attestation key, or other device identifier combined with the PUF 208. Thus, the device identifier is unique to the FPGA 200 and is not spoofable or otherwise forgeable by other devices.

In block 504, the ASE 302 looks up a certificate for the device identifier from the certificate service 104. The device identifier may be established and enrolled during manufacturing or is otherwise known to the certificate service 104. For example, the certificate service 104 may be provided by the manufacturer or other authority associated with the FPGA 200. The certificate may include one or more mappings between the device identifier and one or more testable attributes of the FPGA 200 (e.g., firmware version, PUF attestation key, or other attributes). The certificate may be signed with an authority's key, such as the key of the manufacturer of the FPGA 200.

In block 506, the ASE 302 validates the device certificate received from the certificate service 104. For example, the ASE 302 may validate a signature of the device certificate using the appropriate authority's key. Validating the device certificate may establish that the device certificate is a valid manifest for the FPGA 200. In block 508, the ASE 302 determines whether the device certificate was successfully validated. If not, the method 500 branches to block 530, in which the computing device 102 indicates a validation error occurred. The computing device 102 may indicate an error, attempt to retry the validation, halt processing, or perform any other appropriate action. Referring back to block 508, if the device certificate was successfully validated, the method 500 advances to block 510.

In block 510, the ASE 302 mutually authenticates with the FPGA 200 and receives an attestation response from the FPGA 200. The ASE 302 and the FPGA 200 may perform any mutual authentication process that securely verifies the identity each of the ASE 302 and the FPGA 200. In block 512, the ASE 302 performs a secure key exchange protocol with the FPGA 200 to establish a shared secret, which is a tunnel key. The ASE 302 illustratively performs a SIGMA key exchange protocol, although in other embodiments the ASE 302 may perform any secure key exchange protocol. As part of the exchange protocol, the ASE 302 generates an ephemeral key and sends a value based on the ephemeral key to the FPGA 200. In block 514, the ASE 302 also provides a signed enclave certificate to the FPGA 200. The enclave certificate includes a measurement or other identify of the ASE 302 and is signed by an authority associated with the ASE 302, such as a cloud service provider (CSP) or other owner of the computing device 102. As described further below in connection with FIG. 7, the FPGA 200 may validate the enclave certificate to authenticate the ASE 302. In response to successful authentication, in block 516 the ASE 302 receives an attestation response from the FPGA 200. As described further below, the FPGA 200 generates a similar ephemeral key and derives the tunnel key based on the ephemeral keys. The FPGA 200 returns a value based on its ephemeral key to the ASE 302, and the attestation response may be signed or otherwise protected by the tunnel key.

In block 518, the ASE 302 validates the attestation response based on the device certificate of the FPGA 200. The attestation response includes data indicative of the current configuration of the FPGA 200. For example, the attestation response may be indicative of the current firmware version of the FPGA 200, the model or manufacturer of the FPGA 200, or other attributes of the FPGA 200. In some embodiments, in block 520 the ASE 302 may compare data from the attestation response to certificate data received from the certificate service 104. For example, the ASE 302 may verify that the firmware version indicated in the attestation data matches the firmware version indicated in the device certificate. In some embodiments, in block 522 the ASE 302 may validate one or more testable attributes of the FPGA 200. For example, the ASE 302 may verify that the FPGA 200 has a predetermined firmware version. In some embodiments, in block 524 the ASE 302 may provide the attestation information to a tenant enclave 304 for further validation. Thus, the ASE 302 may delegate validation to the tenant enclave 304. The ASE 302 may mutually authenticate the tenant enclave 304 before providing the attestation information, as described further below.

In block 526, the ASE 302 determines whether the attestation response was validated. If not, the method 500 branches to block 530 to indicate a validation error as described above. If the attestation response was successfully validated, the method 500 advances to block 528.

In block 528, the ASE 302 establishes a secure channel protected by the shared secret tunnel key with the FPGA 200. To establish the secure channel, the ASE 302 may complete the secure key exchange protocol as described above. For example, the ASE 302 may derive the tunnel key based on the ephemeral keys and then send a third SIGMA message in response to the FPGA 200. After establishing the secure channel, the tunnel key may be used to encrypt, wrap, or otherwise protect data exchanged between the ASE 302 and the FPGA 200. Although in the illustrative embodiment the ASE 302 communicates with the FPGA 200 via the secure channel, in some embodiments the ASE 302 may securely provision the tunnel key to one or more other entities such as the tenant enclave 304, and then those entities may securely communicate directly with the FPGA 200. After establishing the secure channel, the method 500 proceeds to block 532, shown in FIG. 6.

In block 532, shown in FIG. 6, the ASE 302 performs mutual attestation with the tenant enclave 304. The ASE 302 and the tenant enclave 304 may perform any mutual authentication process that securely verifies the identity each of the ASE 302 and the tenant enclave 304. In the illustrative embodiment, the ASE 302 and the tenant enclave 304 perform SGX local attestation. In that process, each of the ASE 302 and the tenant enclave 304 execute one or more instructions with the processor 120 to securely generate a report indicative of the respective enclave certificate, enclave measurement, and/or other identity of the enclave. For example, the tenant enclave 304 may execute the EREPORT instruction with the identity of the ASE 302 supplied as a parameter. The processor 120 generates a report data structure that is signed with a report key associated with the ASE 302. The ASE 302 may execute the EGETKEY instruction to retrieve its own report key and validate the report. For mutual attestation, the ASE 302 may similarly provide a report to the tenant enclave 304. If the mutual attestation process is not successful, the computing device 102 may indicate a validation error (not shown). If the mutual attestation process is successful, the method 500 advances to block 534.

In block 534, the ASE 302 receives a bitstream image key and a bitstream data key from the tenant enclave 304. Each of the bitstream image key and the bitstream data key may be embodied as a cryptographic symmetric key or other key that may be used to protect the bitstream image and data exchanged between the tenant enclave 304 and the FPGA 200, respectively. Although illustrated as being received by the ASE 302 from the tenant enclave 304, in some embodiments the ASE 302 may derive the bitstream image key and/or the bitstream data key. In block 536, the ASE 302 wraps the bitstream image key and the bitstream data key with the tunnel key. In block 538, the ASE 302 programs the wrapped bitstream image key and the wrapped bitstream data key to the FPGA 200. Thus, the keys are communicated securely to the FPGA 200 via a secure channel, protected by the tunnel key. Although illustrated as being programmed by the ASE 302, it should be understood that in some embodiments the bitstream data key and/or the bitstream image key may be securely communicated to the FPGA 200 via the secure channel by a different entity, such as the tenant enclave 304.

In block 540, the ASE 302 receives an encrypted bitstream image from the tenant enclave 304. The bitstream image may be embodied as bitstream data or other data that defines accelerator logic to be programmed to the FPGA 200. The bitstream image thus may include business logic, application logic, or other sensitive code associated with the tenant enclave 304. In block 542, the ASE 302 decrypts the bitstream image with the bitstream image key to generate a decrypted bitstream image. Additionally or alterntivaely, in some embodiments the tenant enclave 304 may supply the decrypted bitstream image to the ASE 302.

In block 544, the ASE 302 inspects the decrypted bitstream image and determines whether the bitstream image satisfies a policy supplied by the owner of the computing device 102, cloud service provider, or other authority associated with the computing device 102. For example, for certain FPGAs, it is possible that certain bitstream code can cause physical damage to the FPGA hardware. Thus, in some embodiments the owner policy may prevent installation of bitstream images that may cause physical damage to the FGPA or other accelerator 136. In those embodiments, the bitstream image may be inspected and owner policies may be enforced from within the ASE 302, thus preventing disclosure of the unencrypted bitstream image to the cloud service provider or other platform owner. In block 546, the ASE 302 determines whether the policy was satisfied. If not, the method 500 branches to block 548, in which the computing device 102 indicates a validation error occurred. The computing device 102 may indicate an error, attempt to retry the inspection, halt processing, or perform any other appropriate action. Referring back to block 546, if the owner policy is satisfied, the method 500 advances to block 550.

In block 550, the ASE 302 programs the encrypted bitstream image to the FPGA 200. The ASE 302 may communicate the encrypted bitstream to the FPGA 200 directly and/or via the secure channel protected by the tunnel key. As described further below in connection with FIG. 7, the FPGA 200 decrypts the encrypted bitstream image and installs the decrypted bitstream image to the FPGA 200. For example, the bitstream image may configure, partially configure, or otherwise program one or more AFUs 210 of the FPGA 200. Although illustrated as being encrypted and programmed by the ASE 302, it should be understood that in some embodiments the bitstream image may be encrypted and/or programmed to the FPGA 200 by a different entity, such as the tenant enclave 304. For example, in some embodiments, the ASE 302 may sign the encrypted bitstream image ahead of time, and the tenant enclave 304 may connect directly to the FPGA 200 and program the encrypted bitstream image. As described further below, after programming the FPGA 200, the tenant enclave 304 and the FPGA 200 (e.g., an AFU 210) may securely communicate data protected by the bitstream data key. After securely programming the FPGA 200, the method 500 loops back to block 532, in which the computing device 102 may securely authenticate and provision additional bitstream data.

Figure 7:
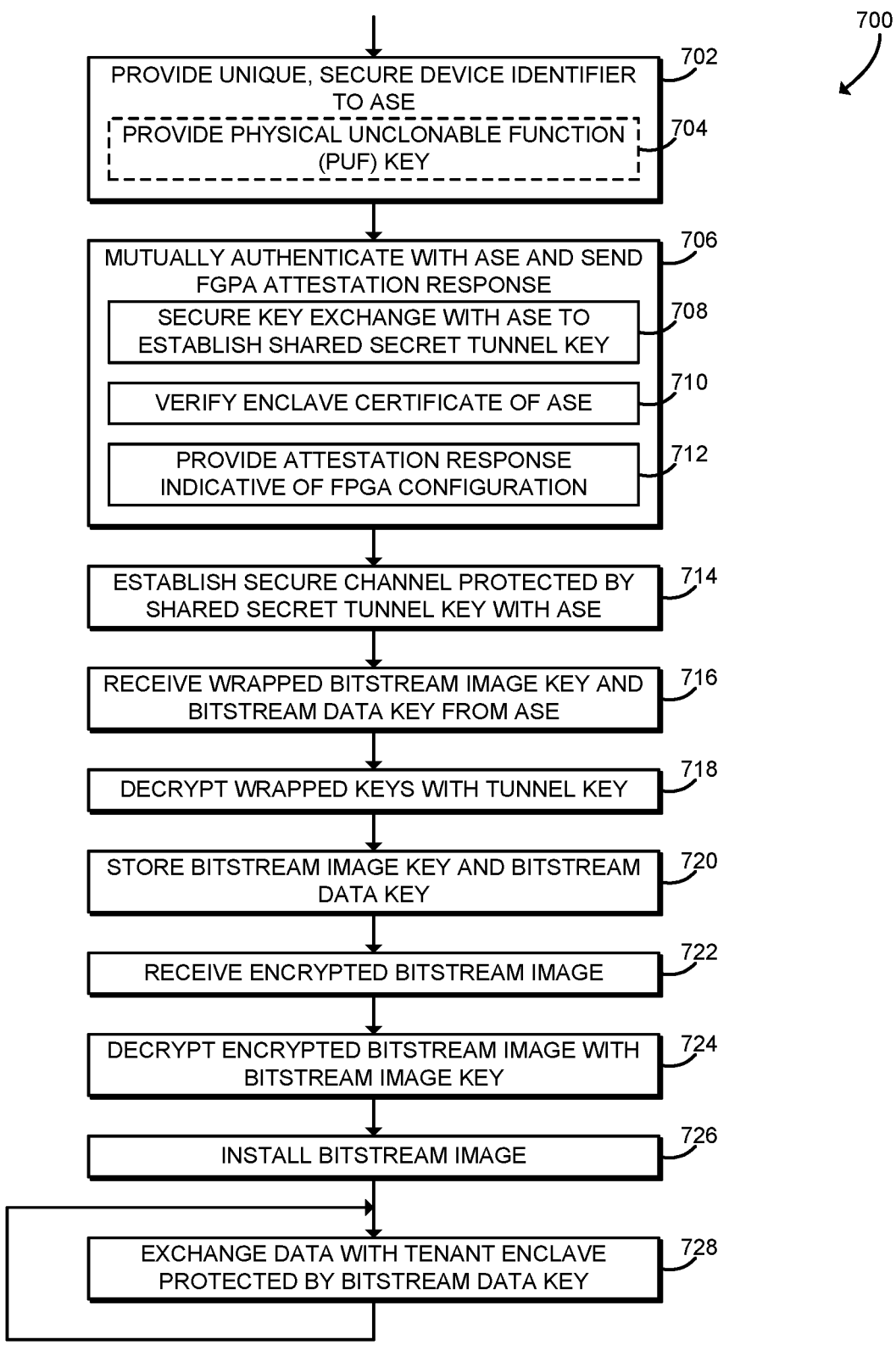
FIG. 7 is a simplified flow diagram of at least one embodiment of a method for secure authentication and programming of an accelerator device that may be executed by the accelerator device of FIGS. 1-3.

Referring now to FIG. 7, in use, the computing device 102 may execute a method 700 for secure authentication and programming of an accelerator device 136. It should be appreciated that, in some embodiments, the operations of the method 700 may be performed by one or more components of the environment 300 of the computing device 102 as shown in FIG. 3 (e.g., the authentication logic 306 and/or the tenant logic 308). The method 700 begins in block 702, in which the FPGA 200 provides a unique, secure device identifier to the ASE 302. The device identifier may be provided by the FPGA 200, for example, in response to a request received from the ASE 302. In some embodiments, in block 702 the FPGA 200 may provide a PUF key based on the PUF 208 of the FPGA 200. As described above, the device identifier may be embodied as a value returned by a PUF 208 of the FPGA 200, a PUF attestation key, or other device identifier combined with the PUF 208. Thus, the device identifier is unique to the FPGA 200 and is not spoofable or otherwise forgeable by other devices.

In block 706, FPGA 200 mutually authenticates with the ASE 302 and provides an attestation response to the ASE 302. As described above, the ASE 302 and the FPGA 200 may perform any mutual authentication process that securely verifies the identity each of the ASE 302 and the FPGA 200. In block 708, the FPGA 200 performs a secure key exchange protocol with the ASE 302 to establish a shared secret, which is a tunnel key. The FPGA 200 illustratively performs a SIGMA key exchange protocol, although in other embodiments the FPGA 200 may perform any secure key exchange protocol. As described above, as part of the exchange protocol, the ASE 302 generates an ephemeral key and sends a value based on the ephemeral key to the FPGA 200. The ASE 302 also provides a signed enclave certificate to the FPGA 200. In block 710, the FPGA 200 verifies the enclave certificate of the ASE 302. For example, the enclave certificate may include a measurement or other identify of the ASE 302 and may be signed by an authority associated with the ASE 302, such as a cloud service provider (CSP) or other owner of the computing device 102. The FPGA 200 may validate the enclave certificate using the CSP key to authenticate the ASE 302. In response to successful authentication, in block 712 the FPGA 200 provides an attestation response to the ASE 302 that is indicative of the current configuration of the FPGA 200. The FPGA 200 may generate an ephemeral key, similar to the ephemeral key generated by the ASE 302. The FPGA 200 derives the tunnel key based on the ephemeral keys. The FPGA 200 may return a value based on its ephemeral key to the ASE 302, and the attestation response may be signed or otherwise protected by the tunnel key. As described above, the ASE 302 verifies the attestation response provided by the FPGA 200.

After the ASE 302 verifies the attestation response, in block 714 the FPGA 200 establishes a secure channel protected by the shared secret tunnel key with the ASE 302. To establish the secure channel, the FPGA 200 may complete the secure key exchange protocol as described above. For example, the FPGA 200 may receive a third SIGMA message from the ASE 302 that is signed with the tunnel key. After establishing the secure channel, the tunnel key may be used to encrypt, wrap, or otherwise protect data exchanged between the ASE 302 and the FPGA 200. Although in the illustrative embodiment the FPGA 200 communicates with the ASE 302 via the secure channel, in some embodiments the ASE 302 may securely provision the tunnel key to one or more other entities such as the tenant enclave 304, and then those entities may securely communicate directly with the FPGA 200.

In block 716, the FPGA 200 receives a wrapped bitstream image key and a wrapped bitstream data key from the ASE 302. As described above, the wrapped keys are encrypted or otherwise protected by the tunnel key. Thus, the keys are communicated securely to the FPGA 200 via a secure channel, protected by the tunnel key. Although illustrated as being received from the ASE 302, it should be understood that in some embodiments the bitstream data key and/or the bitstream image key may be securely communicated to the FPGA 200 via the secure channel by a different entity, such as the tenant enclave 304. In block 718, the FPGA 200 unwraps or otherwise decrypts the bitstream data key and the bitstream image key using the tunnel key. In block 720, the FPGA 200 stores the bitstream image key and the bitstream data key.

In block 722, the FPGA 200 receives an encrypted bitstream image. The encrypted bitstream image may be received from the ASE 302 directly and/or via the secure channel protected by the tunnel key. Although illustrated as being received from the ASE 302, it should be understood that in some embodiments the encrypted bitstream image may be provided to the FPGA 200 by a different entity, such as the tenant enclave 304. In block 724, the FPGA 200 decrypts the encrypted bitstream image. In block 726, the FPGA 200 installs the decrypted bitstream image to the FPGA 200. The FPGA 200 may perform configuration, partial configuration, or otherwise configure logic resources of the FPGA 200 to implement the bitstream image. For example, the FPGA 200 may instantiate or otherwise configure one or more AFUs 210 of the FPGA 200.

After programming the FPGA 200, the method 700 advances to block 728, in which the FPGA 200 securely exchanges data with the tenant enclave 304, protected by the bitstream data key. For example, the tenant enclave 304 may transfer input data to the corresponding AFU 210 of the FPGA 200. The AFU 210 may perform one or more acceleration operations on the input data and generate output data. The AFU 210 may transfer the output data back to the tenant enclave 304. Transfers in both directions are encrypted or otherwise protected by the bitstream data key. The data transfers may include MMIO transactions, DMA transactions, or other data transfers between the processor 120 and/or the memory 130 and the FPGA 200. The method 700 loops back to block 728 to continue securely exchanging data between the tenant enclave 304 and the FPGA 200.

Figure 8:
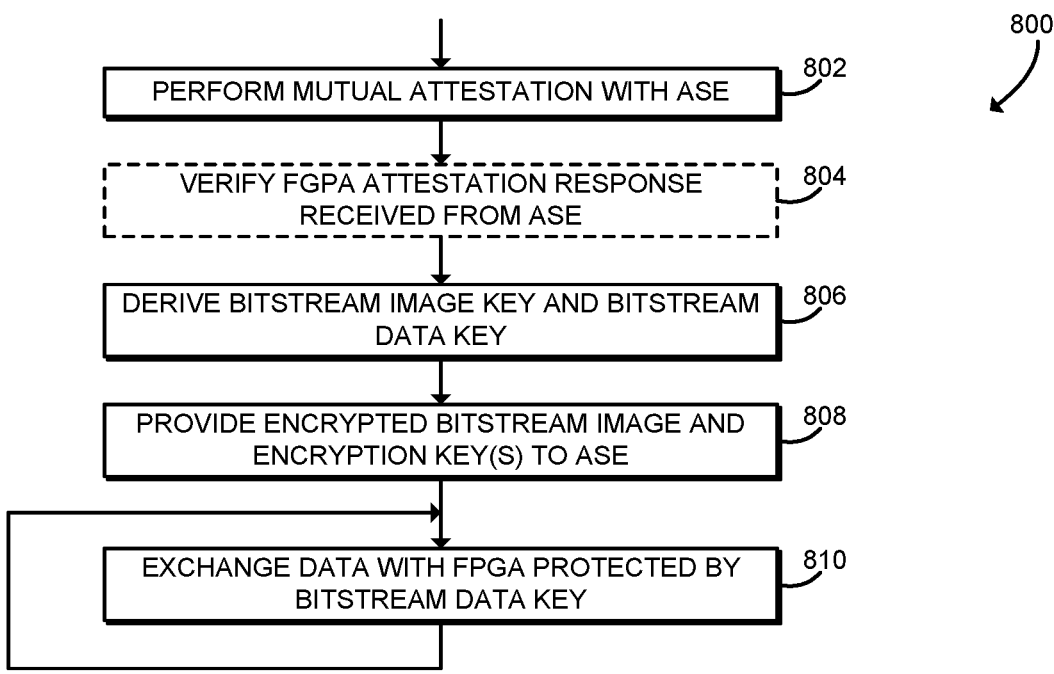
FIG. 8 is a simplified flow diagram of at least one embodiment of a method for secure tenant authentication and programming of an accelerator device that may be executed by the computing device of FIGS. 1-3.

Referring now to FIG. 8, in use, the computing device 102 may execute a method 800 for secure authentication and programming of an accelerator device 136. It should be appreciated that, in some embodiments, the operations of the method 800 may be performed by one or more components of the environment 300 of the computing device 102 as shown in FIG. 3 (e.g., the tenant enclave 304). The method 800 begins in block 802, in which the tenant enclave 304 performs mutual attestation with the ASE 302. As described above, the ASE 302 and the tenant enclave 304 may perform any mutual authentication process that securely verifies the identity each of the ASE 302 and the tenant enclave 304. In the illustrative embodiment, the ASE 302 and the tenant enclave 304 perform SGX local attestation. In that process, each of the ASE 302 and the tenant enclave 304 execute one or more instructions with the processor 120 to securely generate a report indicative of the respective enclave certificate, enclave measurement, and/or other identity of the enclave. For example, the ASE 302 may execute the EREPORT instruction with the identity of the tenant enclave 304 supplied as a parameter. The processor 120 generates a report data structure that is signed with a report key associated with the tenant enclave 304. The tenant enclave 304 may execute the EGETKEY instruction to retrieve its own report key and validate the report. As described above, for mutual attestation, the tenant enclave 304 may similarly provide a report to the ASE 302. If the mutual attestation process is not successful, the computing device 102 may indicate a validation error (not shown). If the mutual attestation process is successful, the method 800 advances to block 804.

In some embodiments, in block 804 the tenant enclave 304 may verify an FPGA attestation response received from the ASE 302. As described above, the FPGA attestation response includes data indicative of the current configuration of the FPGA 200. The tenant enclave 304 may verify the attestation response by validating one or more testable attributes of the FPGA 200 or otherwise evaluating the configuration of the FPGA 200. If the FPGA attestation response is successfully verified, the method 800 advances to block 806.

In block 806, the tenant enclave 304 derives the bitstream image key and the bitstream data key. As described above, each of the bitstream image key and the bitstream data key may be embodied as a cryptographic symmetric key or other key that may be used to protect the bitstream image and data exchanged between the tenant enclave 304 and the FPGA 200, respectively. Although illustrated as being derived by the tenant enclave 304, it should be understood that in some embodiments the bitstream image key and/or the bitstream data key may be derived by another entity and securely provisioned to the tenant enclave 304.

In block 808, the tenant enclave 304 provides an encrypted bitstream image and associated encryption keys to the ASE 302. As described above, the bitstream image may be embodied as bitstream data or other data that defines accelerator logic to be programmed to the FPGA 200. The bitstream image thus may include business logic, application logic, or other sensitive code associated with the tenant enclave 304. As described above, the bitstream image is encrypted with the bitstream image key and securely programmed to the FPGA 200. Thus, the bitstream image may not be disclosed to any entity outside of the trusted code base (TCB) of the tenant enclave 304 such as an untrusted operating system, virtual machine monitor, or other untrusted software. Accordingly, the bitstream image may remain secure even from a cloud services provider, owner, or administrator of the computing device 102. Although illustrated as being programmed by the ASE 302, it should be understood that in some embodiments, the ASE 302 may perform policy checks as described above and return a signed bitstream image to the tenant enclave 304. In those embodiments, the tenant enclave 304 may connect directly to the FPGA 200 and program the FPGA 200 with the signed bitstream image. In those embodiments, the tenant enclave 304 may perform authentication tasks with the FPGA, similar to the authentication tasks performed by the ASE 302 as described above.

In block 810, the tenant enclave 304 securely exchanges data with the FPGA 200, protected by the bitstream data key. For example, as described above, the tenant enclave 304 may transfer input data to the corresponding AFU 210 of the FPGA 200. The AFU 210 may perform one or more acceleration operations on the input data and generate output data. The AFU 210 may transfer the output data back to the tenant enclave 304. Transfers in both directions are encrypted or otherwise protected by the bitstream data key. The data transfers may include MMIO transactions, DMA transactions, or other data transfers between the processor 120 and the FPGA 200. The method 800 loops back to block 810 to continue securely exchanging data between the tenant enclave 304 and the FPGA 200.

It should be appreciated that, in some embodiments, the methods 500, 700, and/or 800 may be embodied as various instructions stored on a computer-readable media, which may be executed by the processor 120, the I/O subsystem 124, the accelerator 136, and/or other components of the computing device 102 to cause the computing device 102 to perform the respective method 500, 700, and/or 800. The computer-readable media may be embodied as any type of media capable of being read by the computing device 102 including, but not limited to, the memory 130, the data storage device 132, firmware devices, other memory or data storage devices of the computing device 102, portable media readable by a peripheral device 138 of the computing device 102, and/or other media.

EXAMPLES

Illustrative examples of the technologies disclosed herein are provided below. An embodiment of the technologies may include any one or more, and any combination of, the examples described below.

Example 1 includes a computing device for secure authentication of an accelerator device, the computing device comprising: an accelerator device; and an accelerator services enclave to: receive, by a trusted execution environment of the computing device, a unique device identifier from the accelerator device; validate, by the trusted execution environment, a device certificate for the unique device identifier in response to receipt of the unique device identifier; authenticate, by the trusted execution environment, the accelerator device in response to validation of the device certificate, wherein to authenticate the accelerator device comprises to receive attestation information indicative of a device configuration of the accelerator device; validate, by the trusted execution environment, the attestation information based on the device certificate; and establish, by the trusted execution environment, a secure channel with the accelerator device in response to validation of the attestation information.

Example 2 includes the subject matter of Example 1, and wherein the accelerator services enclave is further to request, by the trusted execution environment, the device certificate for the unique device identifier from a certificate service.

Example 3 includes the subject matter of any of Examples 1 and 2, and wherein to validate the device certificate comprises to validate the device certificate with a public key of the certificate service.

Example 4 includes the subject matter of any of Examples 1-3, and wherein: to authenticate the accelerator device comprises to perform a secure key exchange with the accelerator device to establish a shared secret key; and to establish the secure channel comprises to complete the secure key exchange to establish the secure channel protected by the shared secret key.

Example 5 includes the subject matter of any of Examples 1-4, and wherein to validate the attestation information comprises to compare the attestation information indicative of the device configuration to device configuration data of the device certificate.

Example 6 includes the subject matter of any of Examples 1-5, and wherein to validate the attestation information comprises to validate a testable attribute the attestation information, wherein the testable attribute is indicative of the device configuration.

Example 7 includes the subject matter of any of Examples 1-6, and wherein the testable attribute comprises a firmware version.

Example 8 includes the subject matter of any of Examples 1-7, and wherein to receive the unique device identifier comprises to receive a device identifier based on a physical unclonable function (PUF) of the accelerator device.

Example 9 includes the subject matter of any of Examples 1-8, and wherein the accelerator service enclave is further to: establish, by the trusted execution environment, a data key; securely communicate, by the trusted execution environment, the data key to the accelerator device via the secure channel; and securely exchange data between the trusted execution environment and the accelerator device protected by the data key in response to communication of the data key to the accelerator device.

Example 10 includes the subject matter of any of Examples 1-9, and wherein to securely communicate the data key comprises to wrap the wrapping the data key with a shared secret key associated with the secure channel.

Example 11 includes the subject matter of any of Examples 1-10, and further comprising a tenant enclave, wherein: the accelerator services enclave is further to (i) authenticate, by the trusted execution environment, a second trusted execution environment, wherein the second trusted execution environment comprises a tenant application of the tenant enclave, and (ii) securely receive, by the trusted execution environment, the data key from the second trusted execution environment in response to authentication of the second trusted execution environment; and the tenant enclave is to securely exchange the data between the tenant application and the accelerator device.

Example 12 includes the subject matter of any of Examples 1-11, and wherein: the accelerator device comprises a field-programmable gate array (FPGA); and the accelerator services enclave is further to: establish, by the trusted execution environment, a bitstream image key; securely communicate, by the trusted execution environment, the bitstream image key to the accelerator device via the secure channel; and program, by the trusted execution environment, the accelerator device with an encrypted bitstream image in response to secure communication of the bitstream image key to the accelerator device, wherein the encrypted bitstream image is encrypted by the bitstream image key.

Example 13 includes the subject matter of any of Examples 1-12, and wherein to program the accelerator device comprises to: communicate, by the trusted execution environment, the encrypted bitstream image to the accelerator device; decrypt, by the accelerator device, the encrypted bitstream image with the bitstream image key to recover a bitstream image; and program the accelerator device with the bitstream image in response to decryption of the encrypted bitstream image.

Example 14 includes the subject matter of any of Examples 1-13, and further comprising a tenant enclave, wherein the accelerator services enclave is further to: authenticate, by the trusted execution environment, a second trusted execution environment, wherein the second trusted execution environment comprises a tenant application of the tenant enclave; and receive, by the trusted execution environment, the encrypted bitstream image from the second trusted execution environment in response to authentication of the second trusted execution environment.

Example 15 includes the subject matter of any of Examples 1-14, and further comprising a tenant enclave, wherein the accelerator services enclave is further to: authenticate, by the trusted execution environment, a second trusted execution environment, wherein the second trusted execution environment comprises a tenant application of the tenant enclave; receive, by the trusted execution environment, an encrypted bitstream image and a bitstream image key from the second trusted execution environment in response to authentication of the second trusted execution environment; decrypt, by the trusted execution environment, the encrypted bitstream image with the bitstream image key to recover a bitstream image; determine, by the trusted execution environment, whether the bitstream image satisfies an owner policy; and program, by the trusted execution environment, the accelerator device with the encrypted bitstream image in response to a determination that the bitstream image satisfies the owner policy.

Example 16 includes the subject matter of any of Examples 1-15, and wherein the accelerator device comprises a field-programmable gate array (FPGA) and wherein the owner policy comprises a hardware safety policy.

Example 17 includes the subject matter of any of Examples 1-16, and wherein the trusted execution environment comprises a secure enclave established with secure enclave support of a processor of the computing device.

Example 18 includes the subject matter of any of Examples 1-17, and wherein the accelerator device comprises a field-programmable gate array (FPGA).

Example 19 includes a method for secure authentication of an accelerator device, the method comprising: receiving, by a trusted execution environment of a computing device, a unique device identifier from an accelerator device of the computing device; validating, by the trusted execution environment, a device certificate for the unique device identifier in response to receiving the unique device identifier; authenticating, by the trusted execution environment, the accelerator device in response to validating the device certificate, wherein authenticating the accelerator device comprises receiving attestation information indicative of a device configuration of the accelerator device; validating, by the trusted execution environment, the attestation information based on the device certificate; and establishing, by the trusted execution environment, a secure channel with the accelerator device in response to validating the attestation information.

Example 20 includes the subject matter of Example 19, and further comprising requesting, by the trusted execution environment, the device certificate for the unique device identifier from a certificate service.

Example 21 includes the subject matter of any of Examples 19 and 20, and wherein validating the device certificate comprises validating the device certificate with a public key of the certificate service.

Example 22 includes the subject matter of any of Examples 19-21, and wherein: authenticating the accelerator device comprises performing a secure key exchange with the accelerator device to establish a shared secret key; and establishing the secure channel comprises completing the secure key exchange to establish the secure channel protected by the shared secret key.

Example 23 includes the subject matter of any of Examples 19-22, and wherein validating the attestation information comprises comparing the attestation information indicative of the device configuration to device configuration data of the device certificate.

Example 24 includes the subject matter of any of Examples 19-23, and wherein validating the attestation information comprises validating a testable attribute the attestation information, wherein the testable attribute is indicative of the device configuration.

Example 25 includes the subject matter of any of Examples 19-24, and wherein the testable attribute comprises a firmware version.

Example 26 includes the subject matter of any of Examples 19-25, and wherein receiving the unique device identifier comprises receiving a device identifier based on a physical unclonable function (PUF) of the accelerator device.

Example 27 includes the subject matter of any of Examples 19-26, and further comprising: establishing, by the trusted execution environment, a data key; securely communicating, by the trusted execution environment, the data key to the accelerator device via the secure channel; and securely exchanging data between the trusted execution environment and the accelerator device protected by the data key in response to communicating the data key to the accelerator device.

Example 28 includes the subject matter of any of Examples 19-27, and wherein securely communicating the data key comprises wrapping the wrapping the data key with a shared secret key associated with the secure channel.

Example 29 includes the subject matter of any of Examples 19-28, and further comprising: authenticating, by the trusted execution environment, a second trusted execution environment, wherein the second trusted execution environment comprises a tenant application; and securely receiving, by the trusted execution environment, the data key from the second trusted execution environment in response to authenticating the second trusted execution environment; wherein securely exchanging the data comprises securely exchanging the data between the tenant application and the accelerator device.

Example 30 includes the subject matter of any of Examples 19-29, and further comprising: establishing, by the trusted execution environment, a bitstream image key; securely communicating, by the trusted execution environment, the bitstream image key to the accelerator device via the secure channel; and programming, by the trusted execution environment, the accelerator device with an encrypted bitstream image in response to securely communicating the bitstream image key to the accelerator device, wherein the accelerator device comprises a field-programmable gate array (FPGA), and wherein the encrypted bitstream image is encrypted by the bitstream image key.

Example 31 includes the subject matter of any of Examples 19-30, and wherein programming the accelerator device comprises: communicating, by the trusted execution environment, the encrypted bitstream image to the accelerator device; decrypting, by the accelerator device, the encrypted bitstream image with the bitstream image key to recover the bitstream image; and programming the accelerator device with the bitstream image in response to decrypting the encrypted bitstream image.

Example 32 includes the subject matter of any of Examples 19-31, and further comprising: authenticating, by the trusted execution environment, a second trusted execution environment, wherein the second trusted execution environment comprises a tenant application; and receiving, by the trusted execution environment, the encrypted bitstream image from the second trusted execution environment in response to authenticating the second trusted execution environment.

Example 33 includes the subject matter of any of Examples 19-32, and further comprising: authenticating, by the trusted execution environment, a second trusted execution environment, wherein the second trusted execution environment comprises a tenant application; receiving, by the trusted execution environment, an encrypted bitstream image and a bitstream image key from the second trusted execution environment in response to authenticating the second trusted execution environment; decrypting, by the trusted execution environment, the encrypted bitstream image with the bitstream image key to recover a bitstream image; determining, by the trusted execution environment, whether the bitstream image satisfies an owner policy; and programming, by the trusted execution environment, the accelerator device with the encrypted bitstream image in response to determining that the bitstream image satisfies the owner policy.

Example 34 includes the subject matter of any of Examples 19-33, and wherein the accelerator device comprises a field-programmable gate array (FPGA) and wherein the owner policy comprises a hardware safety policy.

Example 35 includes the subject matter of any of Examples 19-34, and wherein the trusted execution environment comprises a secure enclave established with secure enclave support of a processor of the computing device.

Example 36 includes the subject matter of any of Examples 19-35, and wherein the accelerator device comprises a field-programmable gate array (FPGA).

Example 37 includes a computing device comprising: a processor; and a memory having stored therein a plurality of instructions that when executed by the processor cause the computing device to perform the method of any of Examples 19-36.

Example 38 includes one or more non-transitory, computer readable storage media comprising a plurality of instructions stored thereon that in response to being executed result in a computing device performing the method of any of Examples 19-36.

Example 39 includes a computing device comprising means for performing the method of any of Examples 19-36.

The invention claimed is:

1. A computing device comprising:
a processor communicably coupled to an accelerator device, the processor to host an accelerator services enclave comprising a first trusted execution environment and utilize the accelerator services enclave to:
receive a unique device identifier from the accelerator device;
validate a device certificate for the unique device identifier in response to receipt of the unique device identifier;
authenticate the accelerator device in response to validation of the device certificate, wherein to authenticate the accelerator device comprises to receive attestation information indicative of a device configuration of the accelerator device;
validate the attestation information based on the device certificate;
establish a secure channel with the accelerator device in response to validation of the attestation information;
authenticate a tenant enclave comprising a second trusted execution environment hosted by the processor, wherein the tenant enclave is hosted by the processor and comprises a tenant application;
in response to authentication of the tenant enclave, receive a bitstream image key and a data key from the tenant enclave;
securely communicate, via the secure channel, encrypted versions of the bitstream image key and of the data key to the accelerator device; and
program the accelerator device via the secure channel using the bitstream image key;
wherein code and data comprised in the accelerator services enclave is protected by hardware protection circuitry of the processor while being executed or while being stored in a protected cache memory of the processor.

2. The computing device of claim 1, wherein the accelerator services enclave is further to request the device certificate for the unique device identifier from a certificate service.

3. The computing device of claim 1, wherein:
to authenticate the accelerator device comprises to perform a secure key exchange with the accelerator device to establish a shared secret key; and
to establish the secure channel comprises to complete the secure key exchange to establish the secure channel protected by the shared secret key.

4. The computing device of claim 1, wherein to validate the attestation information comprises to compare the attestation information indicative of the device configuration to device configuration data of the device certificate.

5. The computing device of claim 1, wherein to validate the attestation information comprises to validate a testable attribute the attestation information, wherein the testable attribute is indicative of the device configuration.

6. The computing device of claim 1, wherein to receive the unique device identifier comprises to receive a device identifier based on a physical unclonable function (PUF) of the accelerator device.

7. The computing device of claim 1, wherein the accelerator service enclave is further to:
establish the data key;
securely communicate the data key to the accelerator device via the secure channel; and
securely exchange data between the accelerator services enclave and the accelerator device protected by the data key in response to communication of the data key to the accelerator device.

8. The computing device of claim 7, wherein the tenant enclave is to securely exchange the data between the tenant application and the accelerator device using the data key.

9. The computing device of claim 7, wherein:
the accelerator device comprises a field-programmable gate array (FPGA); and
the accelerator services enclave is further to:
establish the bitstream image key; and
program the accelerator device with an encrypted bitstream image in response to secure communication of the bitstream image key to the accelerator device, wherein the encrypted bitstream image is encrypted by the bitstream image key.

10. The computing device of claim 9, wherein the accelerator services enclave is further to:
receive the encrypted bitstream image from the tenant enclave in response to authentication of the tenant enclave.

11. The computing device of claim 1, wherein the accelerator services enclave is further to:
receive an encrypted bitstream image and a bitstream image key from the tenant enclave in response to authentication of the tenant enclave;
decrypt the encrypted bitstream image with the bitstream image key to recover a bitstream image;
determine whether the bitstream image satisfies an owner policy; and
program the accelerator device with the encrypted bitstream image in response to a determination that the bitstream image satisfies the owner policy.

12. The computing device of claim 11, wherein the computing device comprises the accelerator device, wherein the accelerator device comprises a field-programmable gate array (FPGA), and wherein the owner policy comprises a hardware safety policy.

13. The computing device of claim 1, wherein the trusted execution environment comprises a secure enclave established with secure enclave support of a processor of the computing device.

14. A method comprising:
receiving, by a first trusted execution environment of a computing device, a unique device identifier from an accelerator device of the computing device;
validating, by the first trusted execution environment, a device certificate for the unique device identifier in response to receiving the unique device identifier;
authenticating, by the first trusted execution environment, the accelerator device in response to validating the device certificate, wherein authenticating the accelerator device comprises receiving attestation information indicative of a device configuration of the accelerator device;
validating, by the first trusted execution environment, the attestation information based on the device certificate;
establishing, by the first trusted execution environment, a secure channel with the accelerator device in response to validating the attestation information;
authenticating a tenant enclave comprising a second trusted execution environment hosted by a processor of the computing device, wherein the tenant enclave is hosted by the processor and comprises a tenant application;
in response to authentication of the tenant enclave, receiving a bitstream image key and a data key from the tenant enclave;
securely communicating, via the secure channel, encrypted versions of the bitstream image key and of the data key to the accelerator device; and
programming the accelerator device via the secure channel using the bitstream image key;
wherein code and data comprised in the first trusted execution environment is protected by hardware protection circuitry of a processor of the computing device while being executed or while being stored in a protected cache memory of the processor.

15. The method of claim 14, further comprising requesting, by the first trusted execution environment, the device certificate for the unique device identifier from a certificate service.

16. The method of claim 14, wherein receiving the unique device identifier comprises receiving a device identifier based on a physical unclonable function (PUF) of the accelerator device.

17. The method of claim 14, further comprising:
establishing, by the first trusted execution environment, the data key;
securely communicating, by the first trusted execution environment, the data key to the accelerator device via the secure channel; and
securely exchanging data between the first trusted execution environment and the accelerator device protected by the data key in response to communicating the data key to the accelerator device.

18. The method of claim 17, wherein securely exchanging the data comprises securely exchanging the data between the tenant application and the accelerator device using the data key.

19. The method of claim 17, further comprising:
establishing, by the first trusted execution environment, the bitstream image key; and
programming, by the first trusted execution environment, the accelerator device with an encrypted bitstream image in response to securely communicating the bitstream image key to the accelerator device, wherein the accelerator device comprises a field-programmable gate array (FPGA), and wherein the encrypted bitstream image is encrypted by the bitstream image key.

20. One or more non-transitory computer-readable storage media comprising a plurality of instructions stored thereon that, in response to being executed, cause a computing device to:
receive, by a first trusted execution environment of the computing device, a unique device identifier from an accelerator device of the computing device;
validate, by the first trusted execution environment, a device certificate for the unique device identifier in response to receiving the unique device identifier;
authenticate, by the first trusted execution environment, the accelerator device in response to validating the device certificate, wherein authenticating the accelerator device comprises receiving attestation information indicative of a device configuration of the accelerator device;
validate, by the first trusted execution environment, the attestation information based on the device certificate;
establish, by the first trusted execution environment, a secure channel with the accelerator device in response to validating the attestation information;
authenticate a tenant enclave comprising a second trusted execution environment hosted by a processor of the computing device, wherein the tenant enclave is hosted by the processor and comprises a tenant application;
in response to authentication of the tenant enclave, receive a bitstream image key and a data key from the tenant enclave;
securely communicate, via the secure channel, encrypted versions of the bitstream image key and of the data key to the accelerator device; and
program the accelerator device via the secure channel using the bitstream image key;
wherein code and data comprised in the first trusted execution environment is protected by hardware protection circuitry of a processor of the computing device while being executed or while being stored in a protected cache memory of the processor.

21. The one or more non-transitory computer-readable storage media of claim 20, wherein the plurality of instructions, in response to being executed, cause the computing device to request, by the first trusted execution environment, the device certificate for the unique device identifier from a certificate service.

22. The one or more non-transitory computer-readable storage media of claim 20, wherein to receive the unique device identifier comprises to receive a device identifier based on a physical unclonable function (PUF) of the accelerator device.

23. The one or more non-transitory computer-readable storage media of claim 20, wherein the plurality of instructions, in response to being executed, cause the computing device to:
establish, by the first trusted execution environment, the data key;

securely communicate, by the first trusted execution environment, the data key to the accelerator device via the secure channel; and securely exchange data between the first trusted execution environment and the accelerator device protected by the data key in response to communicating the data key to the accelerator device.

24. The one or more non-transitory computer-readable storage media of claim 23, wherein to securely exchange the data comprises to securely exchange the data between the tenant application and the accelerator device.

25. The one or more non-transitory computer-readable storage media of claim 23, wherein the plurality of instructions, in response to being executed, cause the computing device to:

establish, by the first trusted execution environment, the bitstream image key; and program, by the first trusted execution environment, the accelerator device with an encrypted bitstream image in response to securely communicating the bitstream image key to the accelerator device, wherein the accelerator device comprises a field-programmable gate array (FPGA), and wherein the encrypted bitstream image is encrypted by the bitstream image key.

\* \* \* \* \*